F. KING.
Steam-Pipe Coupling for Railroad-Cars.
No. 198,027. Patented Dec. 11, 1877.
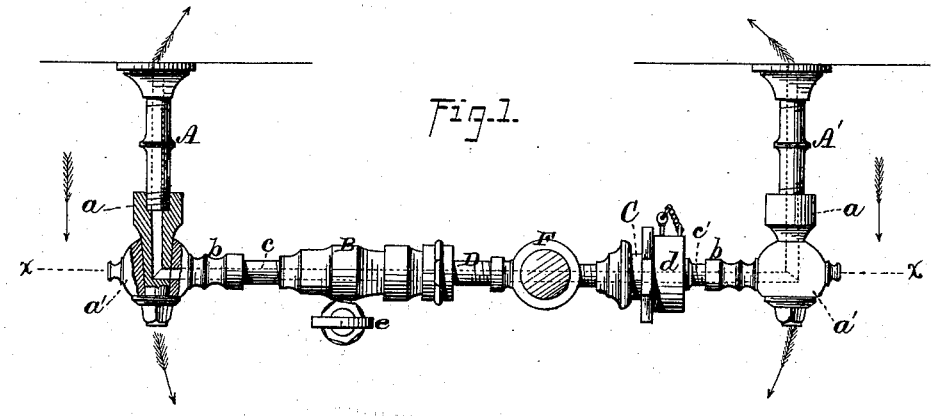
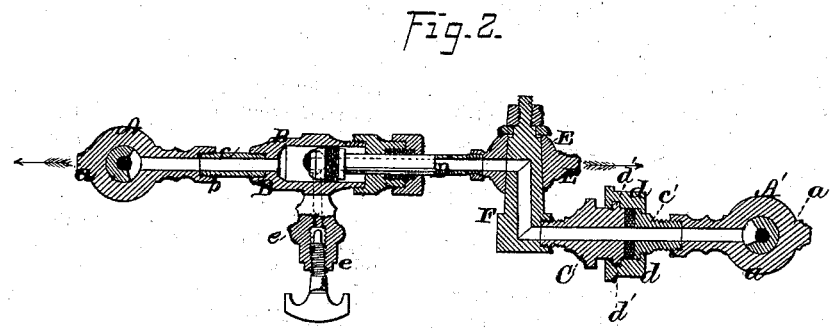
WITNESSES:
Jas. E. Hutchinson
James H. Lange
INVENTOR-
Francis King
per Edson Bros.
Attys.

UNITED STATES PATENT OFFICE.

FRANCIS KING, OF BALTIMORE, MARYLAND, ASSIGNOR OF ONE-HALF HIS RIGHT TO JOHN L. SINN, OF WASHINGTON, DISTRICT OF COLUMBIA.

IMPROVEMENT IN STEAM-PIPE COUPLINGS FOR RAILROAD-CARS.

Specification forming part of Letters Patent No. 198,027, dated December 11, 1877; application filed November 20, 1877.

*To all whom it may concern:*

Be it known that I, FRANCIS KING, of Baltimore, in the county of Baltimore and State of Maryland, have invented certain new and useful Improvements in Steam-Pipe Couplings for Railroad-Cars; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a side elevation of my improved pipe-coupling, and Fig. 2 is a horizontal section thereof through the dotted line *x x* of Fig. 1.

This invention relates to certain improvements in pipe-couplings, particularly adapted for use in connection with steam-heating or air-brake pipes on cars; and it consists of two or more extensible sections of pipe with loosely-fitting and rotating and vibrating joint-connections, substantially as hereinafter more fully set forth.

In the annexed drawings, A A' refer to the two end or upright pipes of the coupling, which pass up through the floors of two opposite cars, and connect with the steam-heating pipes in the cars; or they may be connected to the pipes of an air-brake in coupling said pipes together. The lower ends of these upright pipes are screwed into short tubes *a a*, let into tapering sockets in balls *a' a'*, and nutted upon the lower side of said balls.

This connection or construction of joint permits of the coupling having a horizontal movement, to adapt it to the horizontally-rocking motion of the cars, and causes the upright or end pipes A A' to serve as axes, upon which the coupling turns in conforming to the arc described by the cars in turning a curve.

The balls *a' a'* are provided with short tubes *b b*, which are connected, one with a pipe, B, by a tube, *c*, and the other to a short tube, *c'*, coupled to a pipe, C, by a coupling, *d*.

It will be observed in this connection that the passages in the pipe-tubes *a a* and those in the balls *a' a'* are enlarged where they meet, to provide for communication, or the passage of steam, &c., through the coupling when the said apertures are out of a straight line with each other, as in turning curves.

The coupling *d* is detachably connected to the pipe C by being provided with an inner annular groove, as seen in Fig. 2, which receives projections *d' d'* upon the said pipe. The said groove is provided with openings at opposite points, to permit of the passage thereto and the detachment therefrom of the projections *d' d'* of the pipe C in coupling and uncoupling the said parts. A steam or water tight packing is inserted between the pipe C and tube *c'*, around their communicating passage.

The pipe B is provided with a waste-water cock, *e*, and may be enlarged, as seen in Fig. 2, to receive a sliding or extensible pipe or tube, D, fitted steam or water tight in the said pipe B, and connected to a socketed ball, E, provided with a passage communicating with that of the tube D.

This means of construction permits of the coupling being shortened or lengthened as occasion may require. The same result, in substance, may be obtained without the use of an extensible or sliding pipe, by inclining the upright or end pipes A A' toward or away from each other, they being possessed of such movement by means of the right-angled socketed ball-and-pipe connection or joint E F. F is a right-angled pipe or tube, fitting within and nutted to the socketed ball E, and serves the purpose just mentioned.

This coupling, in addition to the advantages above stated in its favor, is marked for great simplicity and its complete adaptability to all the movements of the cars, and adjustment thereto, rendering it cheap, easy of construction, and desirable for its intended purpose.

Having thus described my invention, what I claim, and desire to secure by Letters Patent, is—

1. The upright or end pipes A A', in combination with the tubes *a a*, socketed balls *a' a'*, and suitable connecting-pipes between said balls *a' a'*, substantially as and for the purpose set forth.

2. The pipes A A', tubes *a a*, socketed balls *a' a'*, tubes *b b*, in combination with the right-angled pipe and socketed ball-joint or connection E F, and suitable pipes connecting the said pipe-and-ball socket to the pipes A A', substantially as and for the purpose set forth.

3. The pipes A A', having the elbows $a\ b$, in combination with the pipe B and extensible or sliding tube or pipe D, suitably connected to said pipes A A', substantially as and for the purpose set forth.

4. The pipes A A', in combination with the elbows, consisting of the tubes $a\ a$ and socketed balls $a'\ a'$, the pipes B D $c$, socketed ball E, pipes F C, coupling $d$, and tube $c'$, substantially as and for the purpose set forth.

In testimony that I claim the foregoing as my own I hereunto affix my signature in presence of two witnesses.

FRANCIS KING.

Witnesses:
UPTON SCOTT,
N. ROBINSON.